United States Patent
Kuboki et al.

(10) Patent No.: US 10,333,186 B2
(45) Date of Patent: Jun. 25, 2019

(54) ELECTRICITY STORAGE PACK

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hideyuki Kuboki, Mie (JP); Hiroki Hirai, Mie (JP); Makoto Higashikozono, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/557,996

(22) PCT Filed: Mar. 2, 2016

(86) PCT No.: PCT/JP2016/056343
§ 371 (c)(1),
(2) Date: Sep. 13, 2017

(87) PCT Pub. No.: WO2016/147861
PCT Pub. Date: Sep. 22, 2016

(65) Prior Publication Data
US 2018/0108959 A1    Apr. 19, 2018

(30) Foreign Application Priority Data
Mar. 19, 2015 (JP) .................. 2015-055923

(51) Int. Cl.
*H01M 10/6551* (2014.01)
*H01M 10/613* (2014.01)
(Continued)

(52) U.S. Cl.
CPC ........ *H01M 10/6551* (2015.04); *H01G 11/18* (2013.01); *H01G 11/80* (2013.01);
(Continued)

(58) Field of Classification Search
CPC ........... H01M 10/6551; H01M 10/613; H01M 10/6567; H01M 10/625
See application file for complete search history.

(56) References Cited

U.S. PATENT DOCUMENTS

2012/0282506 A1* 11/2012 Hohenthanner ...... H01M 2/021
429/99
2013/0266838 A1   10/2013 Von Borck Felix

FOREIGN PATENT DOCUMENTS

JP   2001243993 A   9/2001
JP   2007250707 A   9/2007
(Continued)

OTHER PUBLICATIONS

International Preliminary Report on Patenability for application PCT/JP2016/056343 dated Mar. 16, 2017; 8 pages.
(Continued)

*Primary Examiner* — Osei K Amponsah
(74) *Attorney, Agent, or Firm* — Reising Ethington, P.C.

(57) ABSTRACT

An electricity storage pack includes an electricity storage element, a case that has a heat dissipation member provided on an upper side thereof and that accommodates the electricity storage element, a coolant that is accommodated in the case and that is evaporated by receiving heat of the electricity storage element, and a heat transfer member that is arranged along an outer surface of the electricity storage
(Continued)

element and that receives heat of the electricity storage element. The heat dissipation member is provided with a groove, an end of the heat transfer member being inserted into the groove and being in contact with the groove.

3 Claims, 17 Drawing Sheets

(51) Int. Cl.
*H01M 10/625* (2014.01)
*H01M 10/6567* (2014.01)
*H01M 2/10* (2006.01)
*H01M 10/653* (2014.01)
*H01M 10/647* (2014.01)
*H01M 10/6569* (2014.01)
*H01M 10/6557* (2014.01)
*H01M 10/6554* (2014.01)
*H01G 11/18* (2013.01)
*H01G 11/80* (2013.01)
*H01M 10/6555* (2014.01)

(52) U.S. Cl.
CPC ........... *H01M 2/10* (2013.01); *H01M 10/613* (2015.04); *H01M 10/625* (2015.04); *H01M 10/647* (2015.04); *H01M 10/653* (2015.04); *H01M 10/6554* (2015.04); *H01M 10/6555* (2015.04); *H01M 10/6557* (2015.04); *H01M 10/6567* (2015.04); *H01M 10/6569* (2015.04); *H01M 2220/20* (2013.01)

(56) References Cited

FOREIGN PATENT DOCUMENTS

| | | |
|---|---|---|
| JP | 2010211963 A | 9/2010 |
| JP | 2013504147 A | 2/2013 |
| JP | 2013206666 A | 10/2013 |
| JP | 2013537999 A | 10/2013 |

OTHER PUBLICATIONS

International Search Report for application PCT/JP2016/056343 dated May 24, 2016; 7 pages.

* cited by examiner

ELECTRICITY STORAGE PACK

CROSS REFERENCE TO RELATED APPLICATIONS

This application claims the priority of Japanese patent application JP2015-055923 filed on Mar. 19, 2015, the entire contents of which are incorporated herein.

TECHNICAL FIELD

The present specification discloses a technique for dissipating heat of an electricity storage element.

BACKGROUND ART

Conventional techniques for dissipating heat of an electricity storage element are known. Patent Document 1 (JP 2010-211963A) discloses a battery module in which positive electrode terminals and negative electrode terminals of a plurality of single cells are electrically connected via busbars and that is accommodated in a packing case. Heat dissipation fins are provided on the top of the packing case. A coolant is placed in the lower portion of the packing case, and the coolant absorbed by an absorption sheet is evaporated and condensed, so that heat of the battery is dissipated from the heat dissipation fins to the outside.

SUMMARY

In the technique disclosed in Patent Document 1, heat is dissipated by utilizing the change in the state of the coolant. However, the heat dissipation fins of the case are arranged via a space above the single cells, and a configuration for transferring heat of the single cells directly to the heat dissipation fins is not provided. If a configuration for transferring heat of the single cells directly to the heat dissipation fins could be further provided in addition to a configuration for dissipating heat by utilizing a change in the state of the coolant, this would make it possible to improve heat dissipation, and thus would be preferable.

The present design was accomplished based on the above-mentioned circumstances, and it is an object thereof to improve heat dissipation.

An electricity storage pack of the present design includes an electricity storage element, a case that has a heat dissipation member provided on an upper side thereof and that accommodates the electricity storage element, a coolant that is accommodated in the case and that is evaporated by receiving heat of the electricity storage element, and a heat transfer member that is arranged along an outer surface of the electricity storage element and that receives heat of the electricity storage element, wherein the heat dissipation member is provided with a groove, an end of the heat transfer member being inserted into the groove and being in contact with the groove.

With this configuration, heat of the electricity storage element can be not only dissipated by utilizing a change in the state of the coolant but also dissipated from the heat dissipation member via the heat transfer member due to the heat dissipation member being in contact with the heat transfer member. Therefore, heat dissipation can be improved compared with a case where heat is dissipated only by utilizing a change in the state of the coolant.

Moreover, inserting the end of the heat transfer member into the groove makes it easy to position the heat dissipation member.

The embodiment of the present design may also be configured as follows.

Protrusions that are in areal contact with a groove wall of the groove, and recesses that are arranged adjacent to the protrusions and are not in contact with the groove wall are alternately lined up in the heat transfer member.

With this configuration, the protrusions are in areal contact with the groove wall, and thus the contact area between the heat transfer member and the heat dissipation member can be increased, so that the heat conductivity can be increased. Therefore, the heat dissipation can be improved.

The electricity storage pack further includes an absorption sheet that absorbs the liquid coolant, and the absorption sheet is arranged between the electricity storage element and the heat transfer member.

With this configuration, the coolant absorbed by the absorption sheet receives heat, so that heat of the electricity storage element can be efficiently transferred to the coolant, while the heat transfer member can be used to guide the coolant evaporated from the absorption sheet to the upper side.

With the present design, heat dissipation can be improved.

DESCRIPTION OF EMBODIMENTS

Embodiment 1 will be described with reference to FIGS. 1 to 17.

An electricity storage pack 10 (FIG. 1) is to be mounted in a vehicle such as an electric car or a hybrid car, for example. In the following description, the X direction indicates a "front side", the Y direction indicates an "upper side", and the Z direction indicates a "right side". The electricity storage pack 10 is mounted in a vehicle in an orientation in which the Y direction indicates the upper side.

Figure 4:
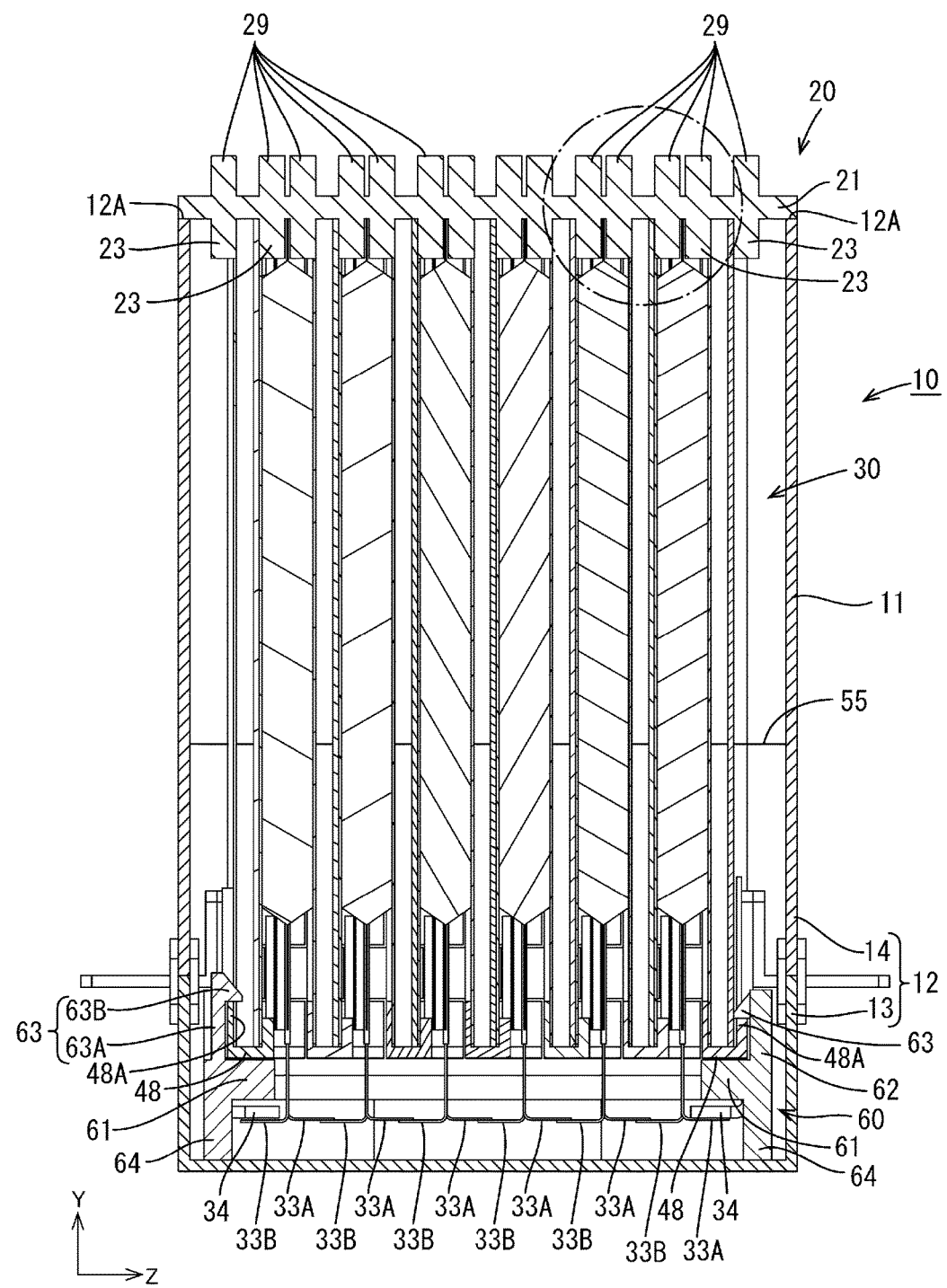
FIG. 4 is a cross-sectional view taken along line A-A in FIG. 3.
Figure 5:
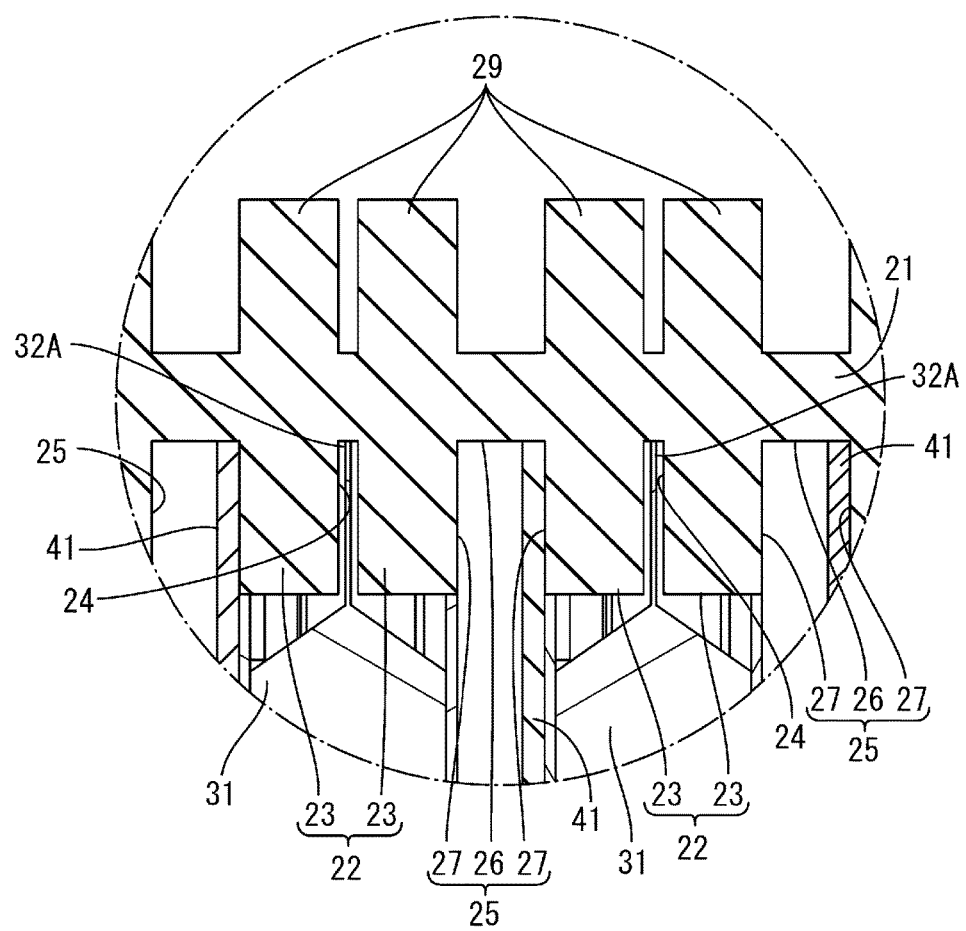
FIG. 5 is an enlarged view of a region surrounded by the dashed dotted line in FIG. 4.
Figure 6:
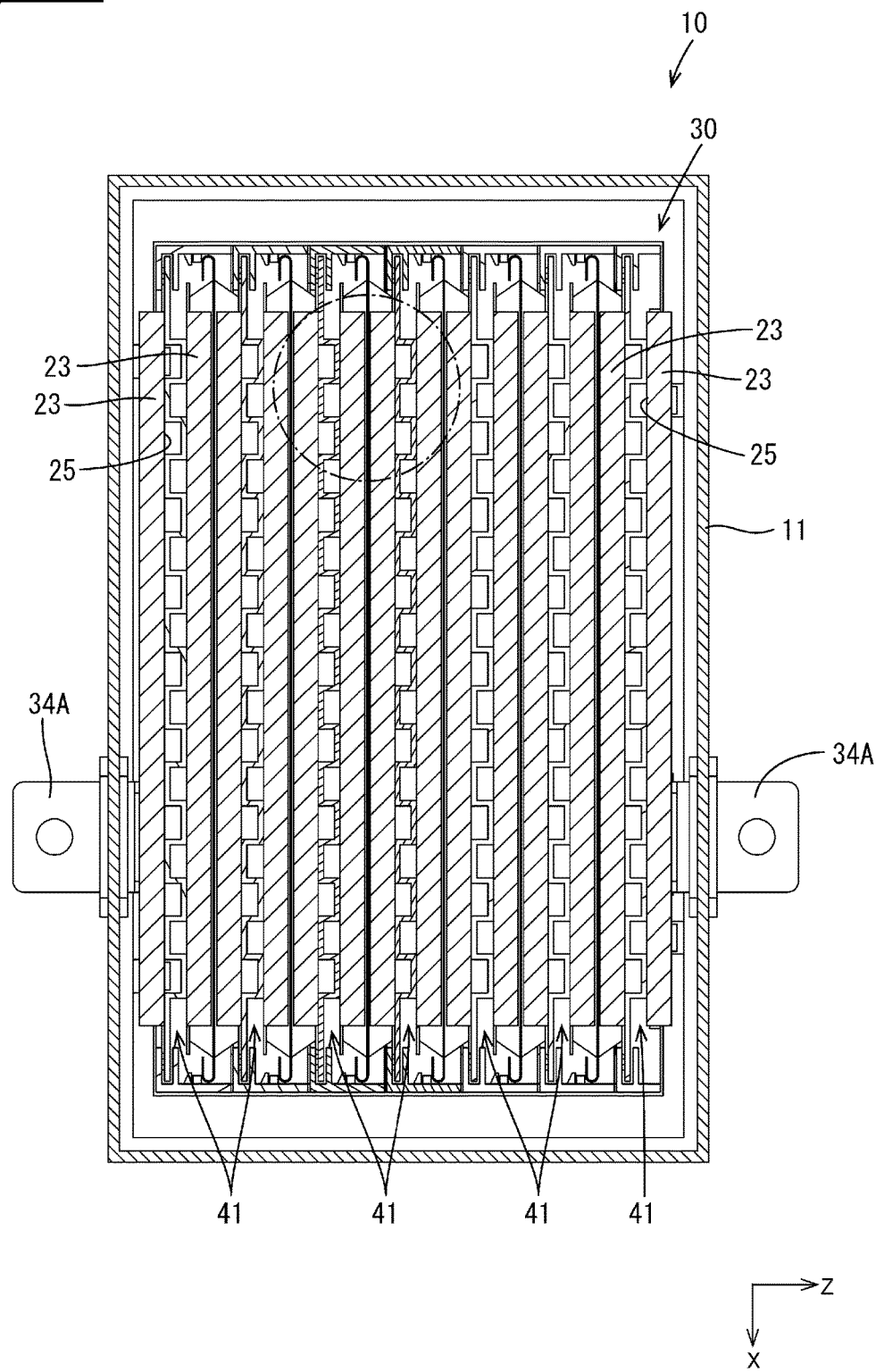
FIG. 6 is a cross-sectional view taken along line B-B in FIG. 3.

As shown in FIG. 4, the electricity storage pack 10 includes a case 11, an electricity storage module 30 accommodated in the case 11, a holding member 60 that holds the electricity storage module 30, and a coolant 55 accommodated in the case 11.

The case 11 is sealed, and includes a case main body 12 that is open at its upper end, and a heat dissipation member 20 that covers an opening 12A of the case main body 12. The case main body is made of metal, for example, and has a polygonal tube shape whose lower end is closed. The case main body 12 includes a receiving portion 13 that is arranged at the lower end and in which the holding member 60 is to be accommodated, and a polygonal tube portion 14 that is arranged above and continuous with the receiving portion 13. In the receiving portion 13, an erect wall having a polygonal tube shape rises from the peripheral edge of a rectangular base plate. The connection portion where the receiving portion 13 and the polygonal tube portion 14 are connected, and the connection portion where the polygonal tube portion 14 and the heat dissipation member 20 are connected are sealed through welding, for example. It should be noted that the material of the case main body 12 is not limited to metal, and the case main body 12 may also be made of a synthetic resin (plastic). In this case, the connection portion where the receiving portion 13 and the polygonal tube portion 14 are connected, and the connection portion where the polygonal tube portion 14 and the heat dissipation member 20 are connected can be sealed using a sealing structure such as an O-ring, for example.

The heat dissipation member 20 includes a plate-shaped portion 21 that has a flat plate shape and that is made of a metal material such as an aluminum alloy or a copper alloy having a high thermal conductivity, for example, a plurality of projections 23 that project downward from the lower surface of the plate-shaped portion 21, and heat dissipation fins 29 that project upward from the top surface of the plate-shaped portion 21. The plate-shaped portion 21 has a rectangular shape, and closes the opening 12A of the case main body 12 without gaps.

Figure 11:
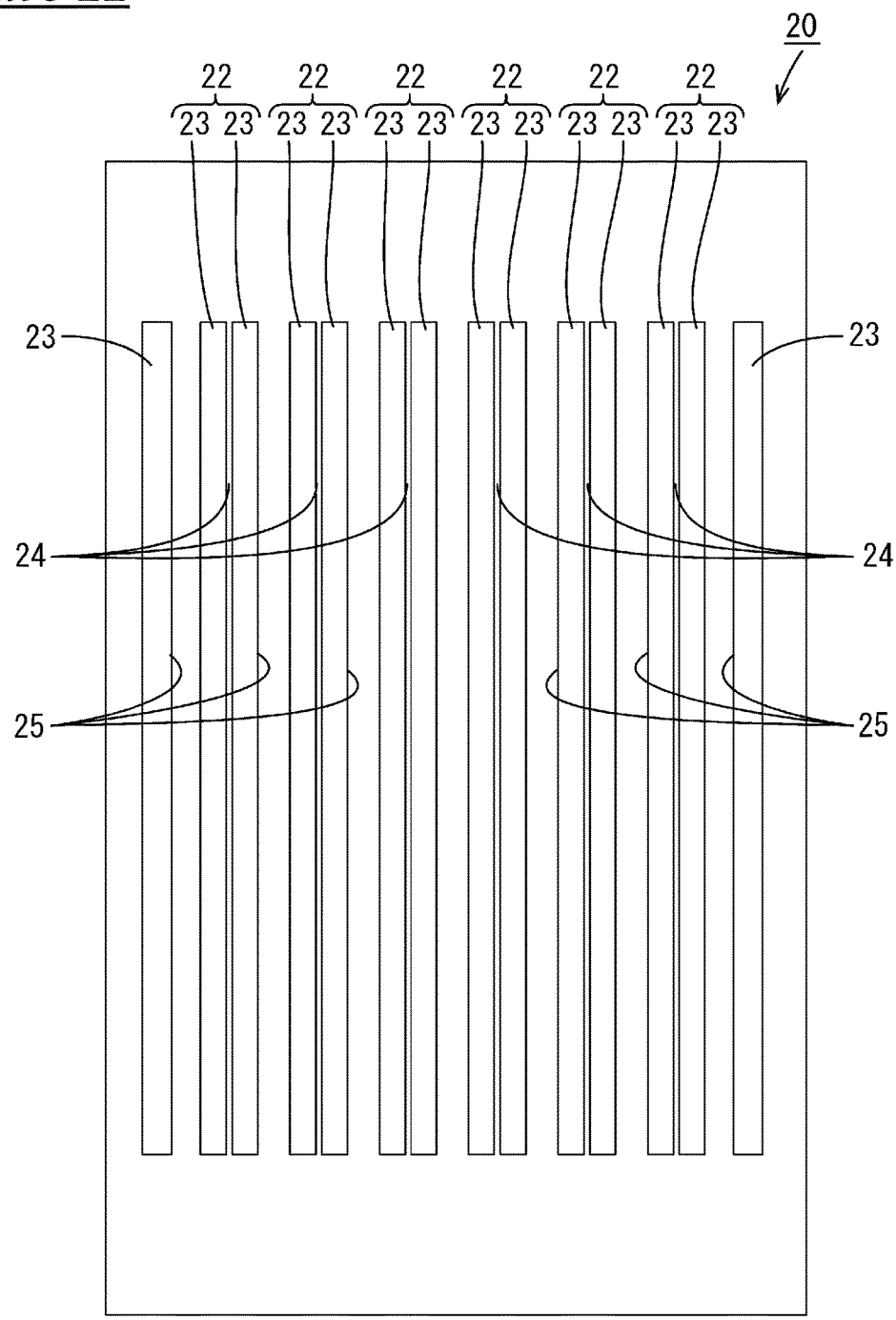
FIG. 11 is a bottom view of the heat dissipation member.

As shown in FIG. 11, the plurality of projections 23 are a plurality of projecting strips that are provided in a region located above the electricity storage module 30 and that extend in the front-rear direction, and are lined up with certain intervals therebetween in the left-right direction (the direction in which electricity storage elements 31 are lined up). Out of the plurality of projections 23, the projections 23 other than those at both ends in the left-right direction form projection pairs 22 that each include two of the projections 23 lined up. In each of the projection pairs 22, the adjacent projections 23 are lined up with a clearance groove 24 being located therebetween. Each of the clearance grooves 24 is formed to have a predetermined depth so as to be capable of accommodating an end 32A formed by fastening stacked laminate films in the electricity storage element 31.

Figure 9:
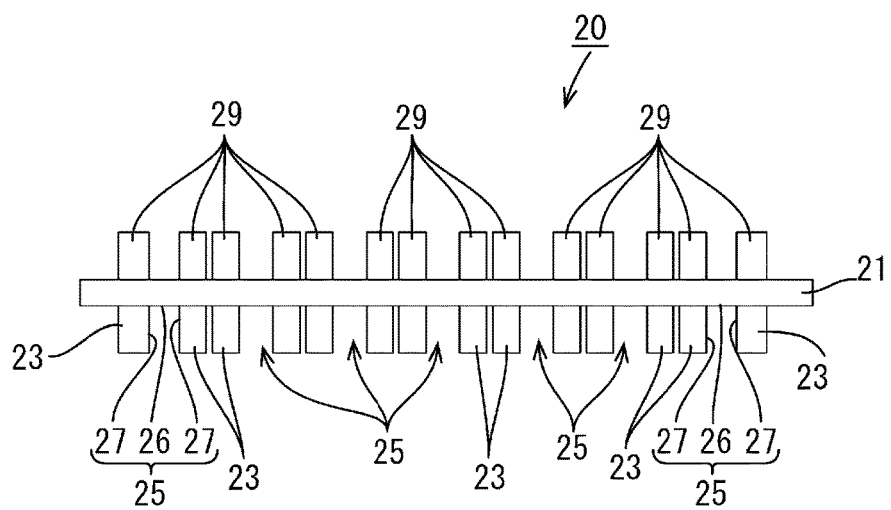
FIG. 9 is a front view of a heat dissipation member.
Figure 10:
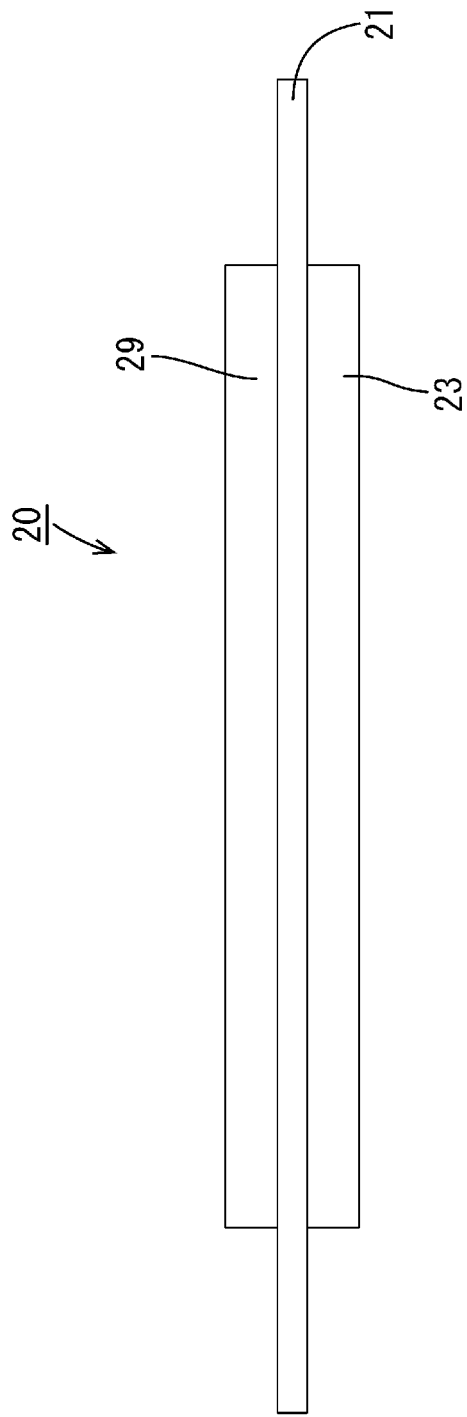
FIG. 10 is a side view of the heat dissipation member.

Grooves 25 into which heat transfer members 41, which will be described later, are to be fitted are formed between the adjacent projection pairs 22, and between the projections 23 on both sides in the line-up direction and the projections 23 adjacent thereto. As shown in FIG. 9, each of the grooves includes a groove bottom 26, and a pair of groove walls 27 rising from the groove bottom 26. The groove width of each of the grooves 25 (interval between the groove walls 27 facing each other) has such a dimension that the heat transfer member 41 can be fitted into it. A plurality of heat dissipation fins 29 are lined up on the top surface of the plate-shaped portion 21. The heat dissipation fins 29 are provided at the same positions of the projections 23 on an XZ plane, facing in a direction opposite to the direction in which the projections 23 face. Therefore, the heat dissipation member 20 is formed in a shape in which the top surface side and the lower surface side are symmetrical.

Figure 14:
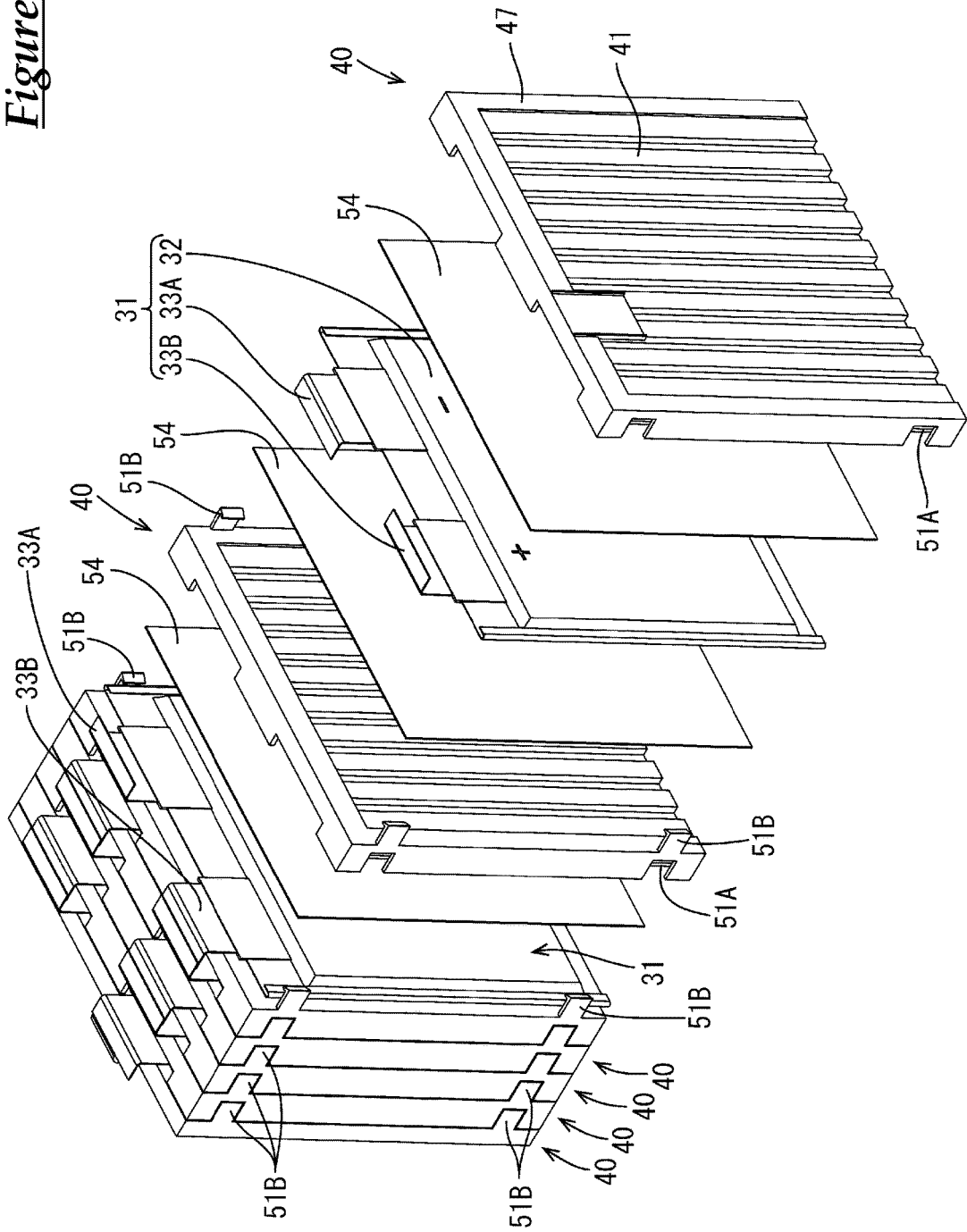
FIG. 14 is a perspective view showing an assembly of an electricity storage module.

As shown in FIG. 14, the electricity storage module 30 includes a plurality of (six in this embodiment) electricity storage elements 31, sandwiching members 40 for sandwiching and holding the electricity storage elements 31, and absorption sheets 54. Each of the electricity storage elements 31 has a flattened and substantially rectangular shape.

Each of the electricity storage elements 31 includes a main body portion 32 composed of a pair of laminate films inside which an electricity storage member is accommodated, and a pair of terminals 33A and 33B (lead terminals) having a male tab shape that is led out outward from the peripheral edge of the main body portion 32. In the main body portion 32, a portion of the pair of laminate films inside which the electricity storage member is accommodated is thickened by the thickness of the electricity storage member. The peripheral edge of the pair of laminate films is fastened through heat-welding or the like. The pair of terminals 33A and 33B includes a positive electrode terminal and a negative electrode terminal, and is bent into an L shape, facing in directions that are opposite to each other. The terminals 33A and 33B are made of a copper alloy, an aluminum alloy, or the like, for example, and their thicknesses are such that the terminals 33A and 33B can be bent easily.

Figure 15:
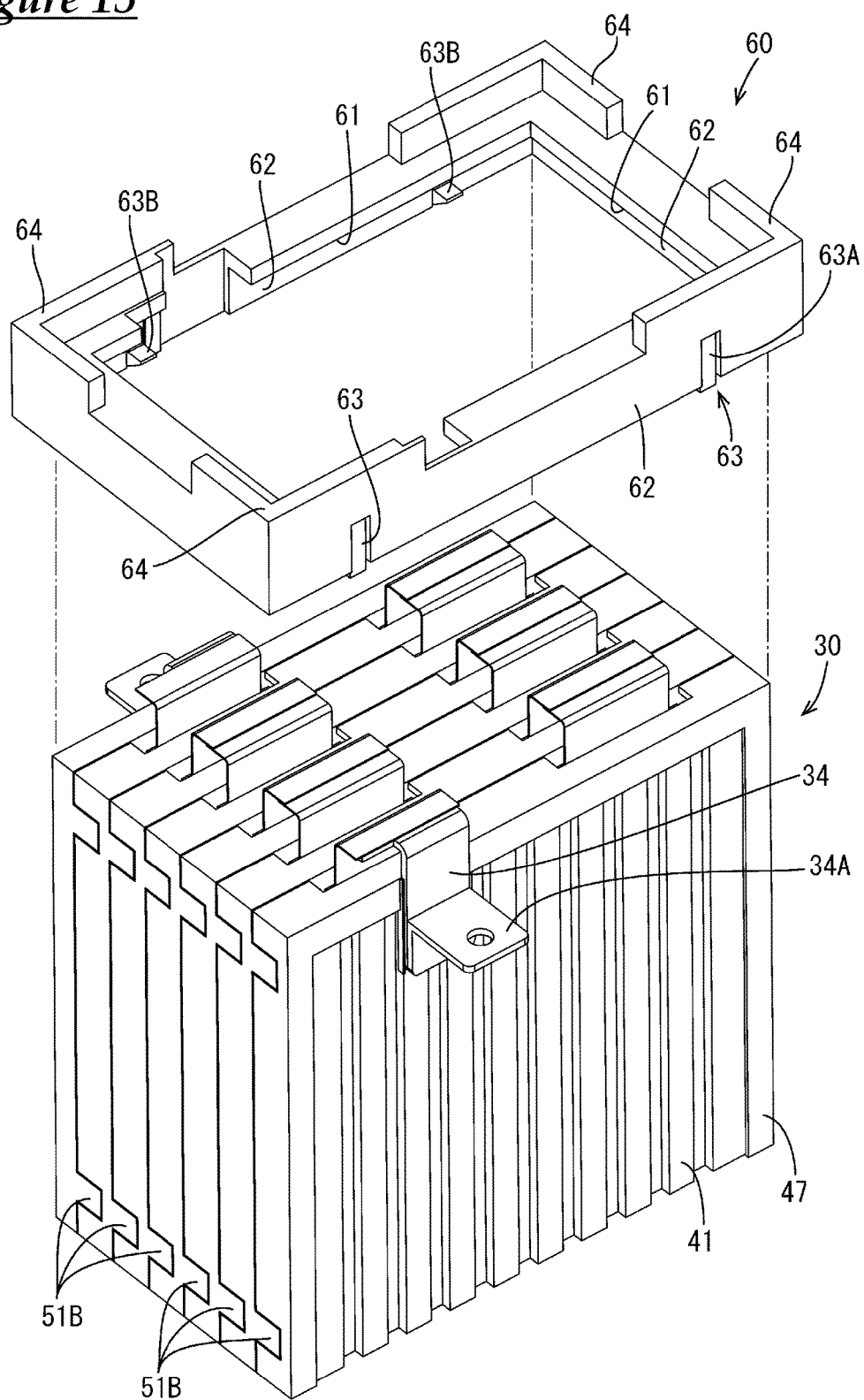
FIG. 15 is a perspective view showing a state in which a holding member is being attached to the electricity storage module.

The electricity storage elements 31 are arranged such that the front surfaces or back surfaces of the adjacent electricity storage elements 31 face in opposite directions. The terminals 33A and 33B of the adjacent electricity storage elements 31 are connected through welding, for example, and thus the plurality of electricity storage elements 31 are connected in series. As shown in FIG. 15, the terminals 33A and 33B located at the ends of the series connection are connected to busbars 34. The busbars 34 are metal plates made of a copper alloy or the like that are connected to the terminals 33A and 33B through welding or the like, and external connecting terminals 34A that can be connected to the outside are led out to the outside from the case 11. Gaps between the busbars 34 and the case 11 are sealed using sealing members 35 made of rubber or the like.

Any electricity storage elements such as secondary batteries, capacitors, or condensers can be used as the electricity storage elements 31 as necessary. For example, secondary batteries such as lithium-ion batteries or nickel-metal hydride batteries are used as the electricity storage elements 31 according to this embodiment.

Figure 12:
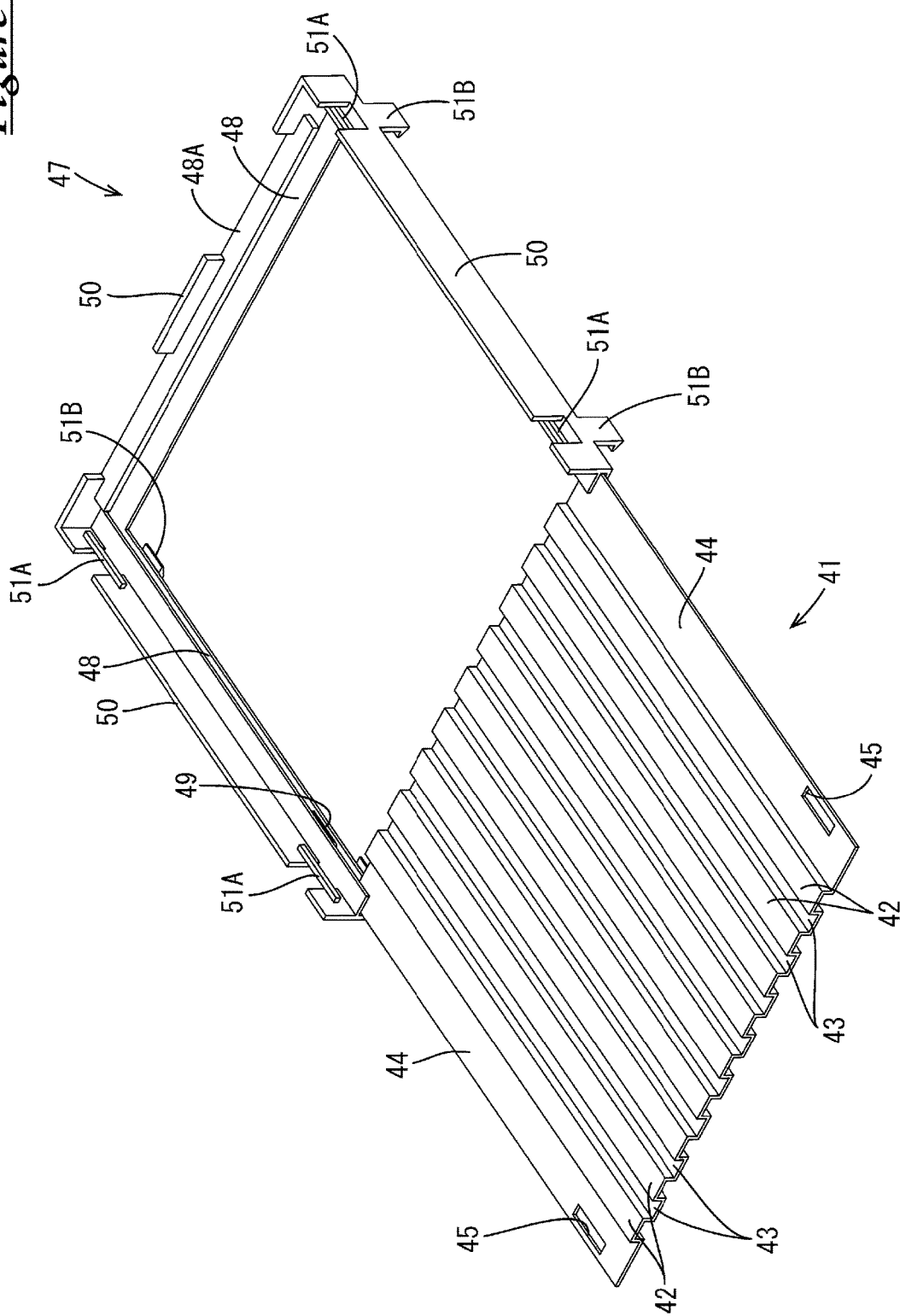
FIG. 12 is a perspective view showing a state in which a heat transfer member is being fitted into a frame-shaped member.
Figure 13:
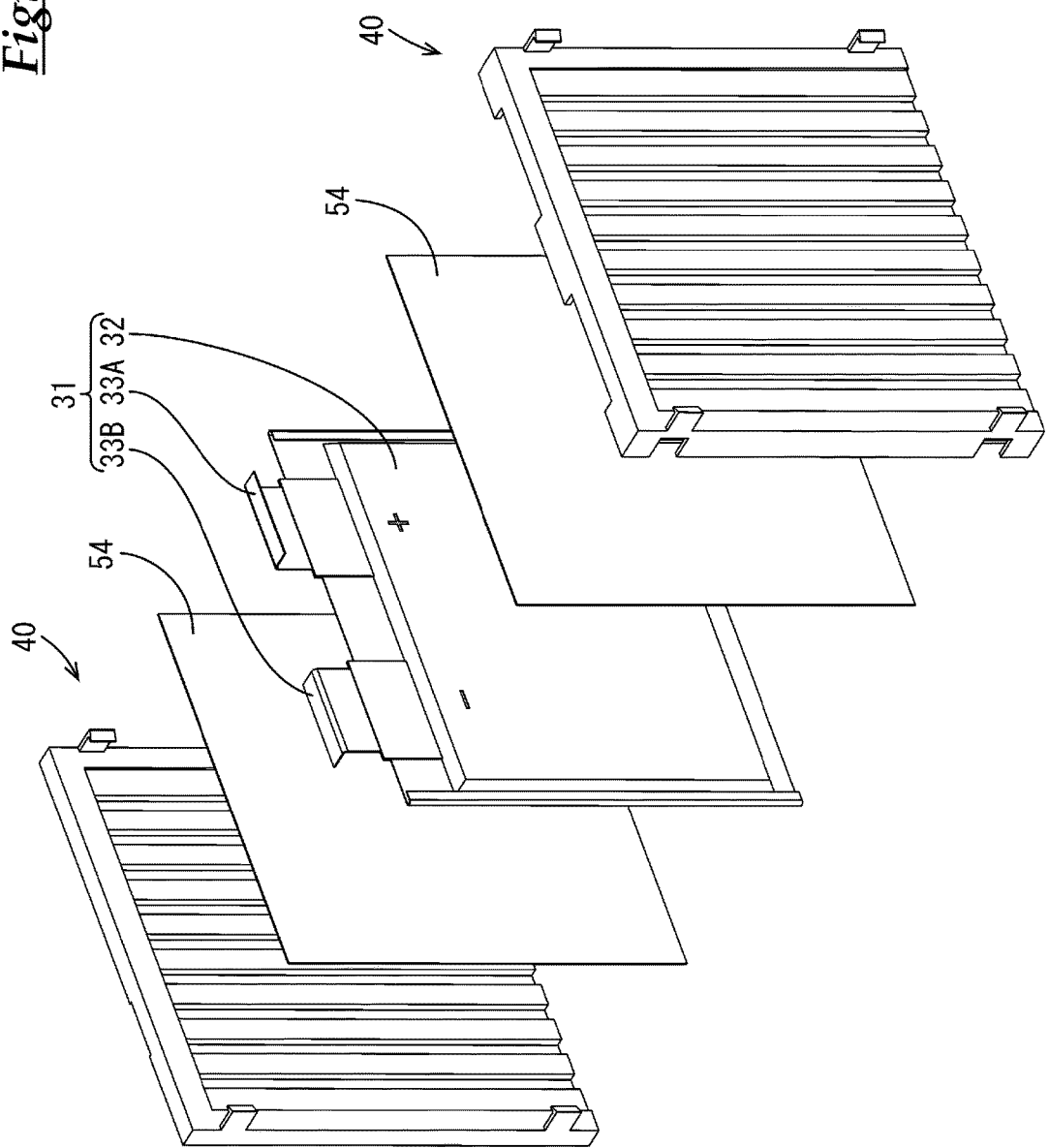
FIG. 13 is a diagram showing a state in which an electricity storage element and an absorption sheet are being sandwiched between a plurality of sandwiching members.

As shown in FIG. 12, each of the sandwiching members 40 includes a heat transfer member 41 and a frame-shaped member 47 into which the heat transfer member 41 is to be fitted.

Figure 7:
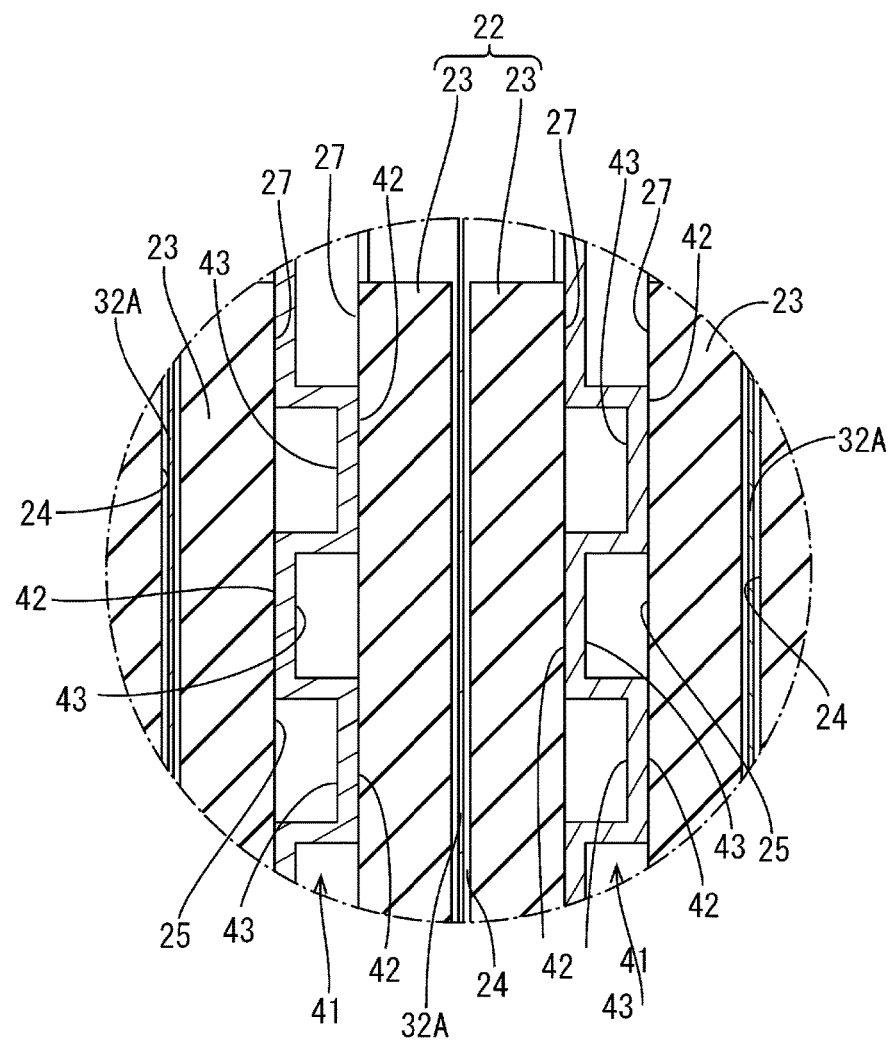
FIG. 7 is an enlarged view of a region surrounded by the dashed dotted line in FIG. 6.
Figure 8:
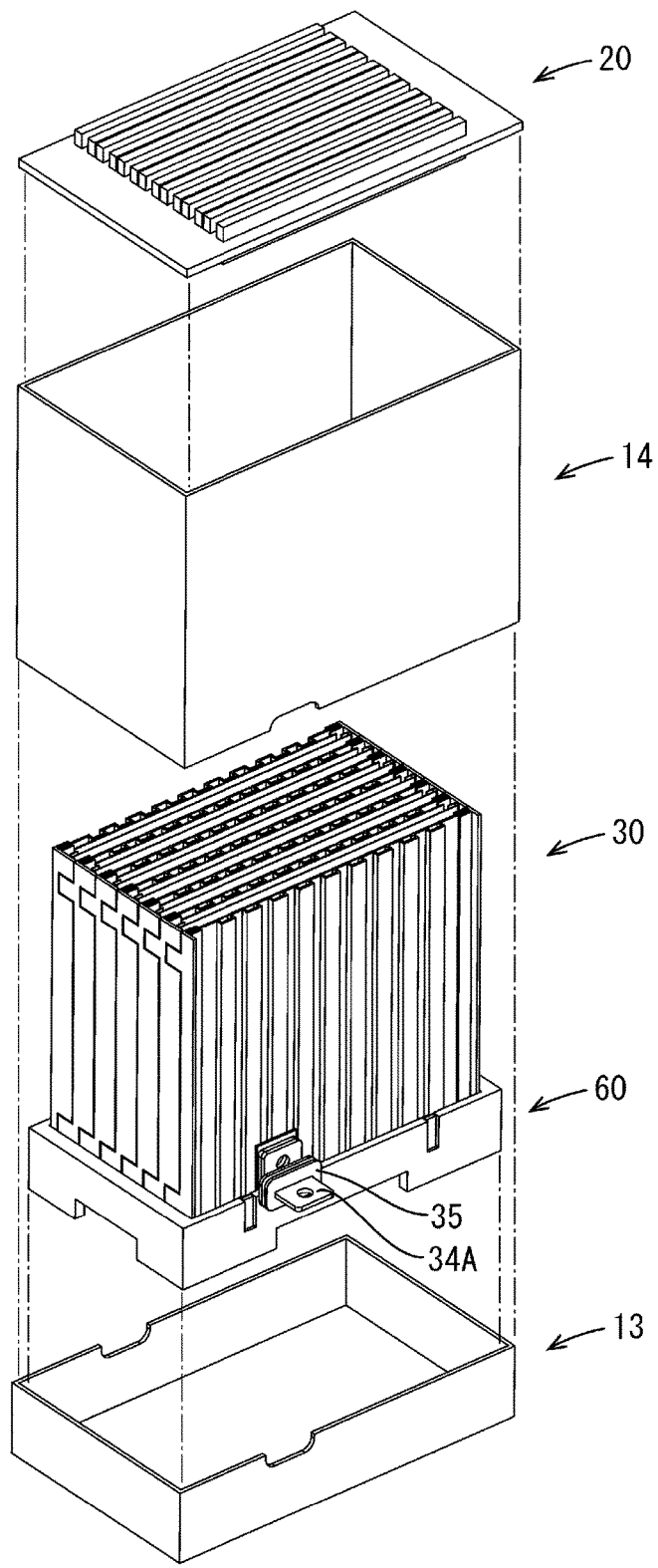
FIG. 8 is an exploded perspective view of the electricity storage pack.

A member made of aluminum, an aluminum alloy, or the like having a high thermal conductivity is used as the heat transfer member 41, and protrusions 42 and recesses 43 are lined up alternately as viewed from the left and from the right. The heat transfer member 41 has the same shape over its entire length in the vertical direction, and therefore, the protrusions 42 and the recesses 43 are respectively formed as protruding strips and recessed strips that extend over the entire length in the vertical direction. The upper end of the heat transfer member 41 is fitted into the groove 25 of the heat dissipation member 20. As a result, as shown in FIG. 7, opposing surfaces of the protrusions 42 come into areal contact with one of the groove walls 27 of the groove 25, and opposing surfaces of the protrusions 42 on the opposite side come into areal contact with the other of the groove walls 27, so that the heat conductivity between the heat transfer member 41 and the heat dissipation member 20 is increased. As shown in FIG. 12, the front and rear ends of the heat transfer member 41 are formed as flat plate portions 44 in which the protrusions 42 and recesses 43 are not formed. Rectangular locking holes 45 for positioning relative to the frame-shaped member 47 are formed through the flat plate portions 44. The heat transfer member 41 is configured such that its upper end extends above the upper end of the absorption sheet 54.

The frame-shaped member 47 is made of an insulating synthetic resin (plastic) and is substantially U-shaped, including a fitting groove 48 into which the edges of the heat transfer member 41 are to be fitted, and a wall portion 50 that is formed along the outer peripheral edge and that projects toward one side in the front-rear direction. The fitting groove 48 is formed over the entire periphery on the inner surface side of the frame shaped member 47. The front and rear edges of the flat plate portion 44 are inserted into the fitting groove 48, and the lower end of the heat transfer member 41 is inserted into the lower portion of the fitting groove 48. Locking projections 49 to be locked to the hole edges of the locking holes 45 of the flat plate portion 44 project from the inner surface of the fitting groove 48.

A coupled portion 51A, and a coupling portion 51B that is to be locked to the coupled portion 51A of the adjacent frame-shaped member 47 are formed in the wall portion 50. The coupled portion 51A is formed as a through hole formed by cutting the wall portion 50, and a locking claw of the coupling portion 51B can be locked to the hole edge of the through hole. In the coupling portion 51B, the locking claw is formed at the leading end of a bending piece that can be elastically deformed. The bending piece is elastically deformed, and thus the locking claw is locked to the coupled portion 51A of the adjacent frame-shaped member 47. As a result, the sandwiching member 40 in which the heat transfer member 41 has been attached to the frame-shaped member 47 is coupled to the adjacent sandwiching member 40 in a state in which the electricity storage element 31 and the absorption sheet 54 are sandwiched between the adjacent sandwiching members 40.

Each of the absorption sheets 54 is a sheet composed of fibers of a porous body that has a rectangular shape with a size such that substantially the entire surface of the main body portion 32 can be covered. For example, a microfiber, which is a very thin chemical fiber, can be used. The absorption sheet 54 can be formed for example through injection molding using a mixture of pulp fibers and a binder.

The coolant 55 is an insulating liquid that is evaporated depending on the temperature, and the coolant 55 is accommodated in liquid form at the lower portion of the case 11 as shown in FIG. 4. The liquid coolant 55 is in contact with the lower portion of the electricity storage module 30 in an orientation in which the terminals 33A and 33B are located on the lower side, and the terminals 33A and 33B are arranged entirely in the liquid coolant 55. Perfluorocarbon or a fluorine-based inert liquid can be used as the coolant 55, for example. Examples of the fluorine-based inert liquid include Novec (registered trademark) HFE (hydro fluoro ether) and Fluorinert (registered trademark) manufactured by 3M.

The absorption sheets 54 absorb the coolant 55 by capillary action. It is sufficient if the amount of the coolant 55 is such that the plurality of absorption sheets 54 can absorb the coolant 55. The coolant 55 that has been absorbed by the absorption sheets 54 receives heat from the electricity storage elements 31, and thus is evaporated. Heat of the electricity storage elements 31 is absorbed as evaporation heat of the coolant 55, and thus a rise in temperature of the electricity storage elements 31 is suppressed.

When the vapor of the coolant 55 moves upward and reaches the heat dissipation member 20, heat of the vapor is transferred to the heat dissipation member 20, and heat is dissipated from the heat dissipation fins 29 and the like. As a result, the temperature of the vapor of the coolant 55 decreases, and thus the coolant 55 is devolatilized and falls toward the bottom surface of the case 11.

As shown in FIGS. 4 and 15, the holding member 60 has a frame shape, and includes a plate-shaped mount portion 61 on which the ends of the frame-shaped members 47 are mounted, a holding wall 62 that projects upward from the mount portion 61 and is configured to hold the electricity storage module 30 thereinside, and supporting portions 64 that project downward from the mount portion 61 and are mounted on the bottom wall of the case 11 to support the electricity storage module 30.

The mount portion 61 has a plate shape with a predetermined thickness, and projects inward such that the outer peripheral edge of the electricity storage module 30 (lower ends of the frame-shaped members 47) can be mounted thereon. The holding wall 62 is provided along the entire periphery of the electricity storage module 30, and locking portions 63 that are to be locked to the frame-shaped members 47 are formed by cutting portions of the holding wall 62. Each of the locking portions 63 includes a bending piece 63A that projects in a direction in which the holding wall 62 rises and that can be elastically deformed, and a locking claw 63B located at the leading end of the bending piece. The locking claws 63B are locked to the upper ends of groove walls 48A of the fitting grooves 48 on the lower end side of the frame-shaped members 47 at the ends of the coupling, and thus the electricity storage module 30 is held on the mount portion 61. The supporting portions 64 are formed in an L shape at the corners of the holding member 60, and have such a height that the terminals 33A and 33B of the electricity storage module 30 held by the holding member 60 are not in contact with the bottom surface of the case 11.

Next, a process for assembling the electricity storage pack 10 will be described.

Figure 16:
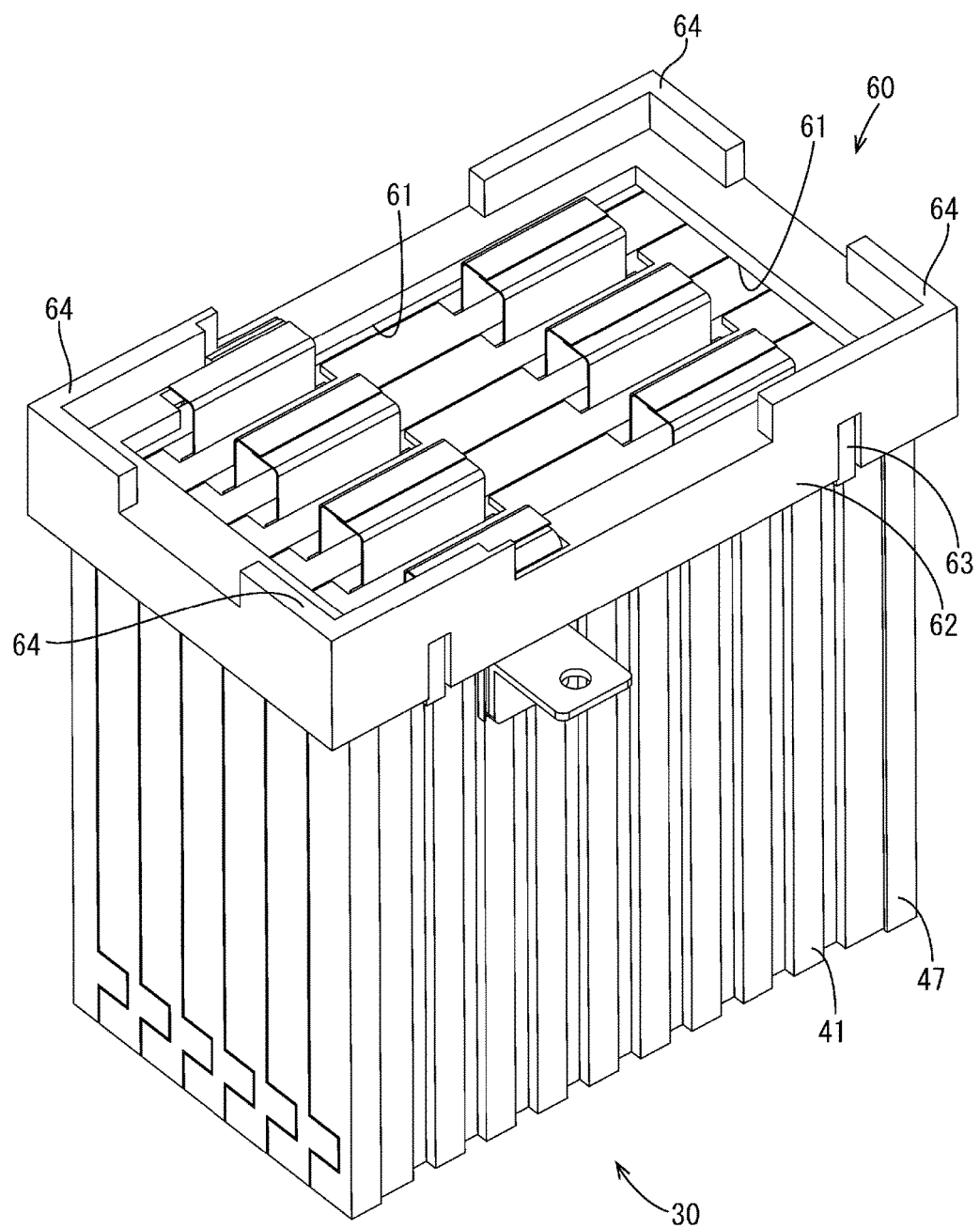
FIG. 16 is a perspective view showing a state in which the holding member is attached to the electricity storage module.
Figure 17:
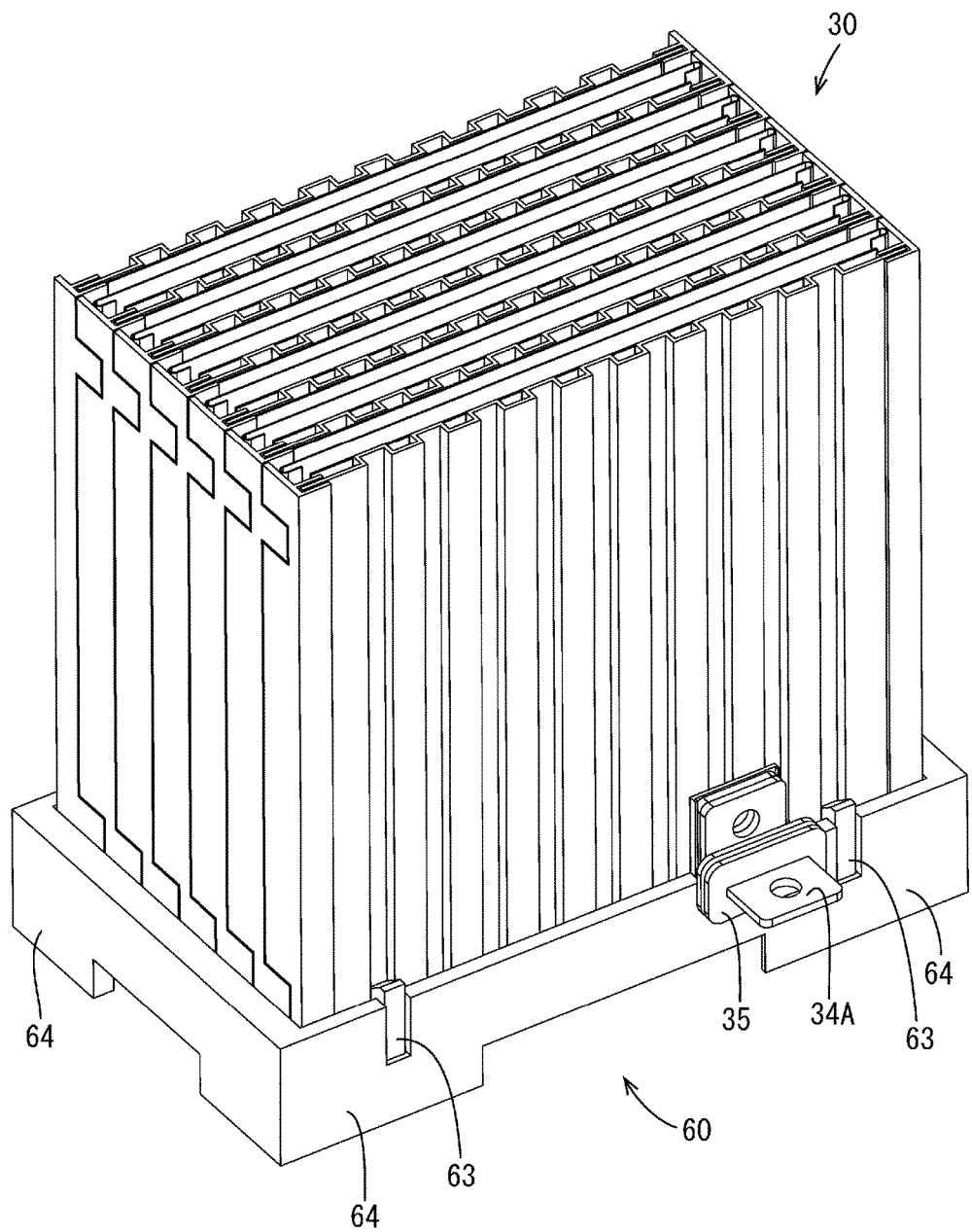
FIG. 17 is a perspective view of a state shown in FIG. 16 as viewed from above.

The plurality of sandwiching members 40 are formed by fitting the heat transfer members 41 into the frame-shaped members 47 (FIGS. 12 and 13), the electricity storage elements 31 and the plurality of absorption sheets 54 are sandwiched between the plurality of sandwiching members 40, and the frame-shaped members 47 are sequentially coupled by coupling the coupled portion 51A to the coupling portion 51B of the adjacent sandwiching member 40 (FIG. 14). The electricity storage module 30 is formed by coupling the plurality of sandwiching members 40 as shown in FIG. 15, and thus the holding member 60 is attached to the terminals 33A and 33B side of the electricity storage module 30 (FIG. 16).

Figure 1:
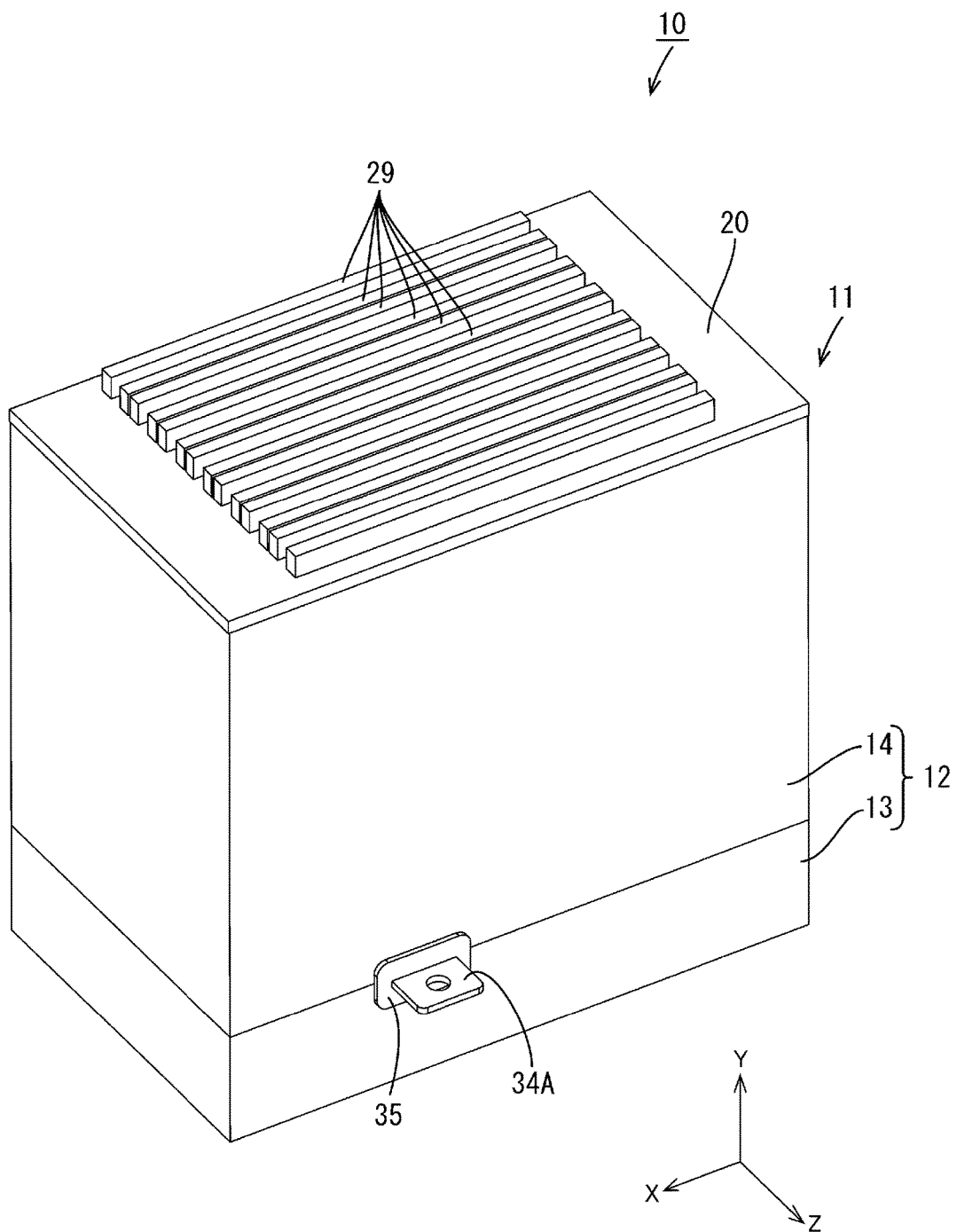
FIG. 1 is a perspective view of an electricity storage pack of an embodiment.
Figure 2:
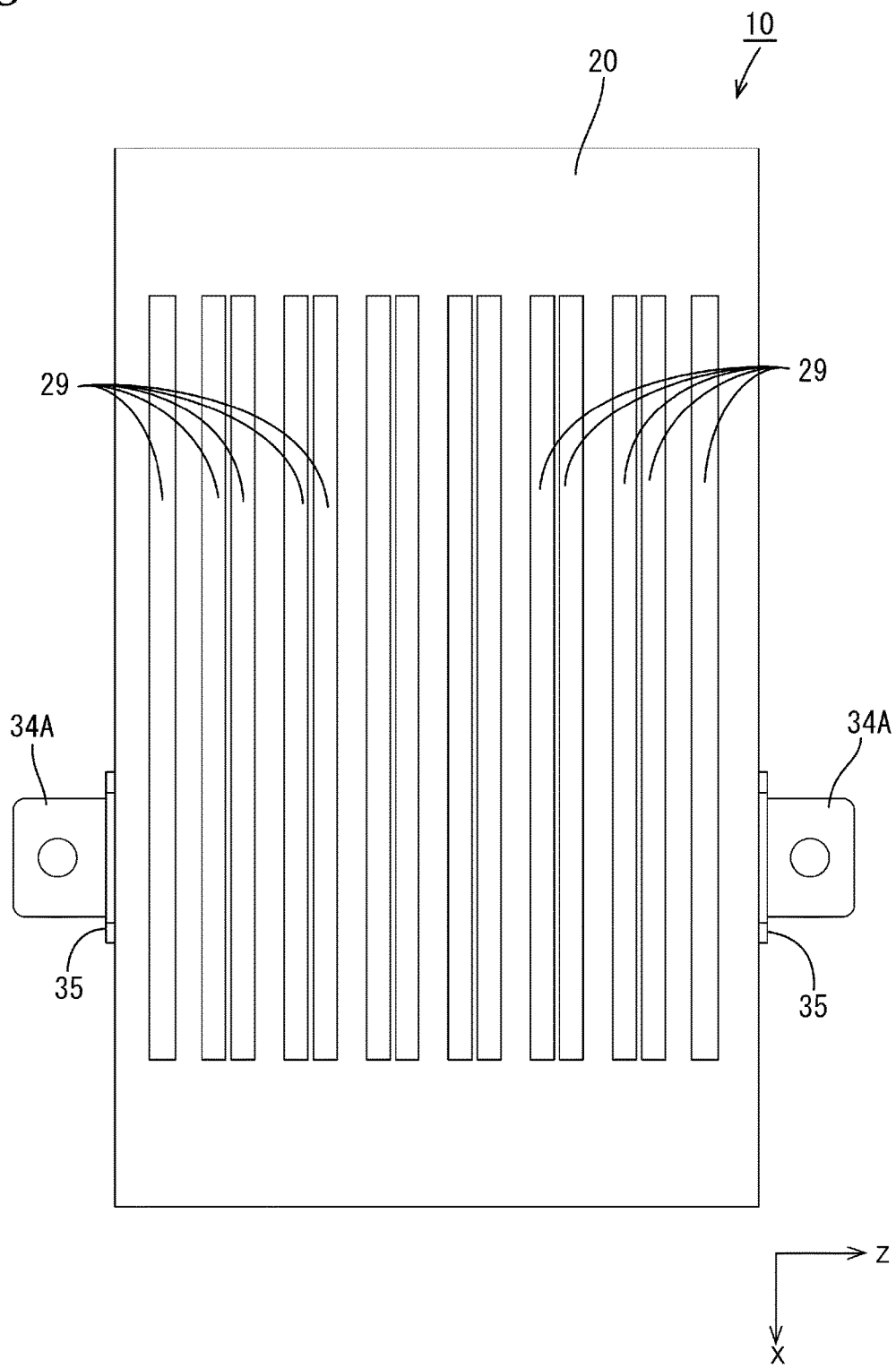
FIG. 2 is a plan view of the electricity storage pack.
Figure 3:
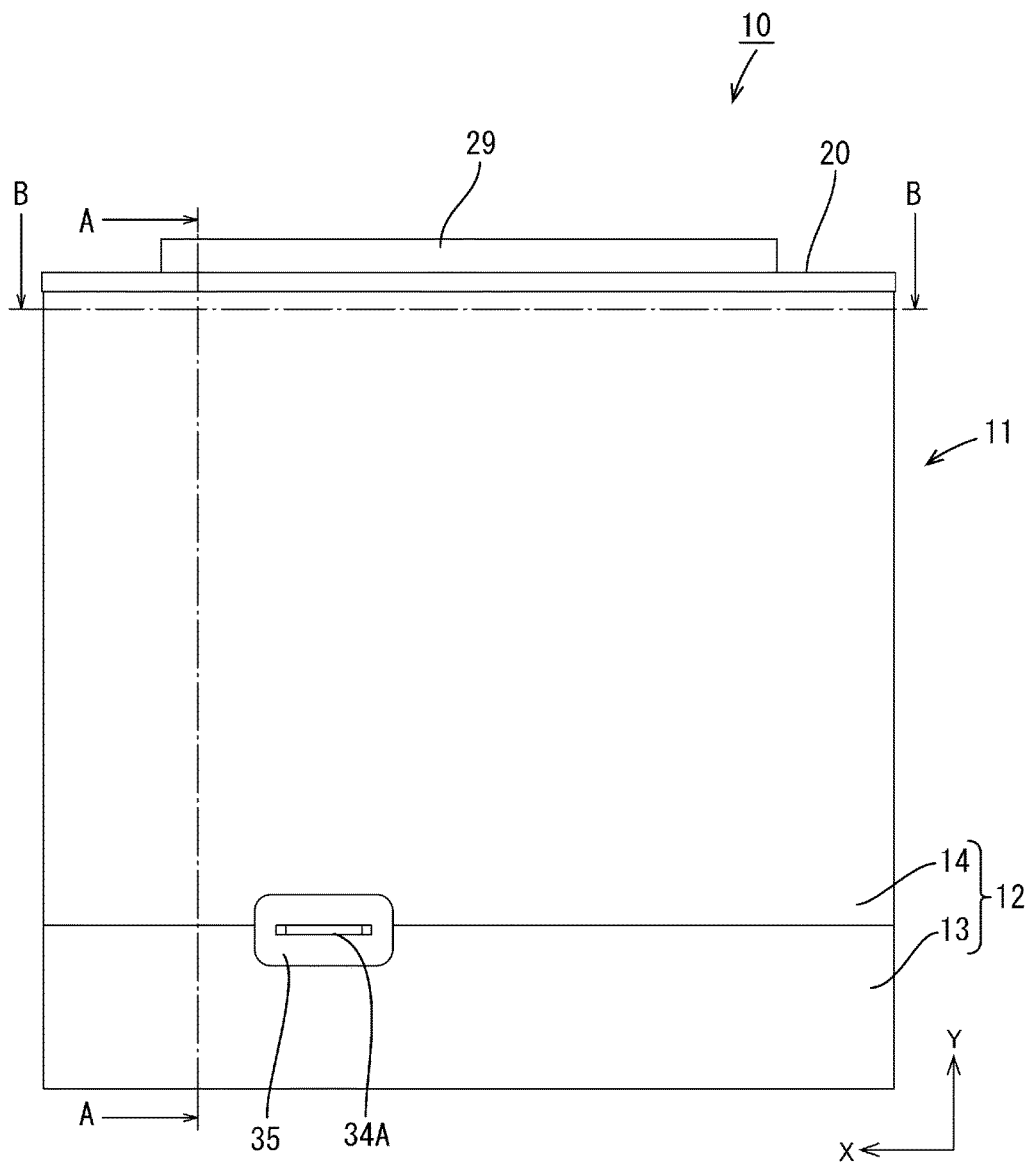
FIG. 3 is a right side view of the electricity storage pack.

Next, the electricity storage module 30 in which the holding member 60 has been attached to its lower side, and the coolant 55 are accommodated in the case main body 12. Then, the case main body 12 is covered with the heat dissipation member 20 and sealed while the grooves 25 of the heat dissipation member 20 are positioned at the upper end of the heat transfer member 41. The electricity storage pack 10 is thus formed (FIG. 1).

With this embodiment, the following operational effects are exerted.

With this embodiment, the heat transfer members 41 arranged along the outer surfaces of the electricity storage elements 31 receive heat of the electricity storage elements 31, and the ends of the heat transfer members 41 are inserted into the grooves 25 of the heat dissipation member 20 and are in contact therewith. Therefore, heat of the electricity storage elements 31 can be not only dissipated by utilizing a change in the state of the coolant 55 but also dissipated directly from the heat dissipation member 20 via the heat transfer members 41 that are in contact with the heat dissipation member 20. Accordingly, the heat dissipation can be improved compared with a case where heat is dissipated only by utilizing a change in the state of the coolant 55. Moreover, inserting the ends of the heat transfer members 41 into the grooves 25 makes it easy to position the heat dissipation member 20.

The protrusions 42 that are in areal contact with the groove walls 27 of the grooves 25, and the recesses that are arranged adjacent to the protrusions 42 and are not in contact with the groove walls 27 are alternately lined up in the heat transfer member 41.

With this configuration, the protrusions 42 are in areal contact with the groove walls 27, and thus the contact area between the heat transfer members 41 and the heat dissipation member 20 can be increased, so that the heat conductivity can be increased. Therefore, the heat dissipation can be improved.

The electricity storage pack further includes the absorption sheets 54 that come into contact with the coolant 55 and absorb the coolant 55, and the absorption sheets 54 are each arranged between the electricity storage element 31 and the heat transfer member 41.

With this configuration, the coolant 55 absorbed by the absorption sheets 54 receives heat, so that heat of the electricity storage elements 31 can be efficiently transferred to the coolant 55, while the heat transfer member 41 can be used to guide the coolant 55 evaporated from the absorption sheets 54 to the heat dissipation member 20 on the upper side.

Other Embodiments

The technique disclosed in this specification is not limited to the embodiment that has been described above with reference to the drawings, and embodiments such as those described below may also be included, for example.

Although a configuration in which the protrusions 42 on both surfaces of each of the heat transfer members 41 are in areal contact with the pair of groove walls 27 of each of the grooves 25 was shown in the above embodiment, there is no limitation thereto. For example, a configuration is also possible in which the protrusions 42 on one surface of each of the heat transfer members 41 are in areal contact with one groove wall 27 of each of the grooves 25, and the protrusions 42 on the other surface are not in areal contact with the other groove wall 27 of each of the grooves 25.

Although a configuration in which each of the heat transfer members 41 is in contact with the groove bottom 26 and the pair of groove walls 27 of each of the grooves 25 was shown in the above embodiment, there is no limitation thereto. Each of the heat transfer members 41 may also be in contact with at least one of the groove bottom 26 and the groove walls 27 of each of the grooves 25.

Although a configuration in which the absorption sheets 54 are provided was shown in the above embodiment, the absorption sheet 54 is not necessarily provided.

The numbers of the electricity storage elements 31, the heat transfer member 41, and the like are not limited to the numbers shown in the above embodiment, and the numbers thereof may also be different.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10: Electricity storage pack
11: Case
20: Heat dissipation member
25: Groove
30: Electricity storage module
31: Electricity storage element
40: Sandwiching member
41: Heat transfer member
42: Protrusion
43: Recess
54: Absorption sheet
55: Coolant

The invention claimed is:

1. An electricity storage pack comprising:
an electricity storage element;
a case that has a heat dissipation member provided on an upper side thereof and that accommodates the electricity storage element, the heat dissipation member includes a plate-shaped portion having a plate shape, a plurality of projections that project from the plate-shaped portion, and a groove formed between adjacent ones of the projections;
a coolant that is accommodated in the case and that is evaporated by receiving heat of the electricity storage element;
a heat transfer member that is arranged along an outer surface of the electricity storage element and that receives heat of the electricity storage element; and
a frame-shaped member into which edges of the heat transfer member are fitted,
wherein the frame-shaped member includes a coupled portion and a coupling portion that is locked to the coupled portion of an adjacent frame-shaped member, wherein an end of the heat transfer member is inserted into the groove and is in contact with the groove.

2. The electricity storage pack according to claim 1, wherein protrusions that are in areal contact with a groove wall of the groove, and recesses that are arranged adjacent to the protrusions and are not in contact with the groove wall are alternately lined up in the heat transfer member.

3. The electricity storage pack according to claim 1, further comprising an absorption sheet that absorbs the liquid coolant, wherein the absorption sheet is arranged between the electricity storage element and the heat transfer member.

\* \* \* \* \*